Nov. 8, 1955      D. W. SHERMAN      2,723,066
DEMOUNTABLE CARRIER FOR SPARE AUTOMOBILE WHEELS
Filed July 24, 1952      2 Sheets-Sheet 1
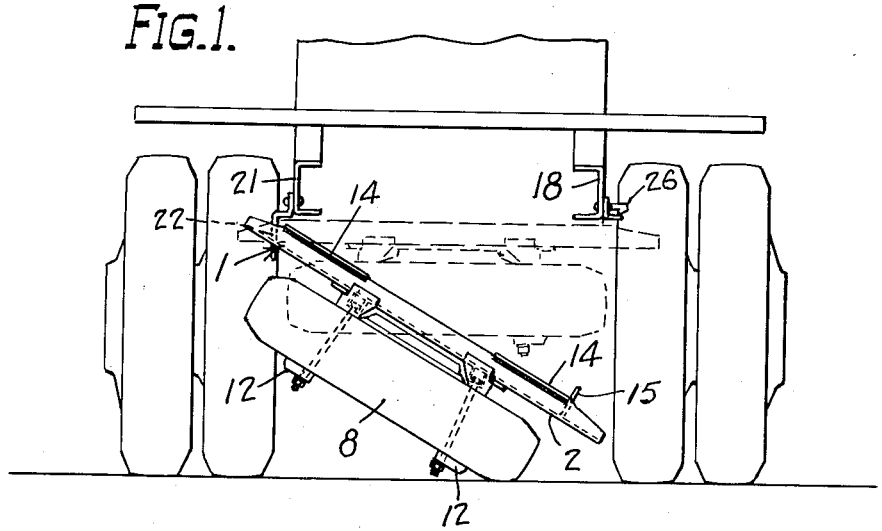
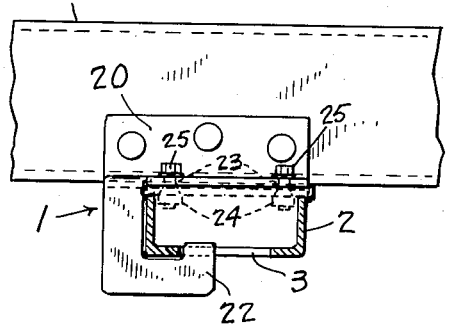
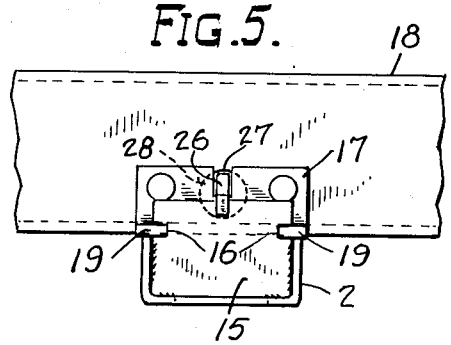
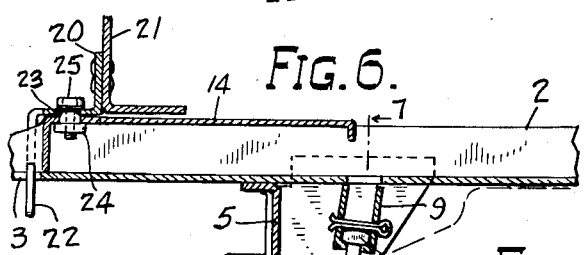
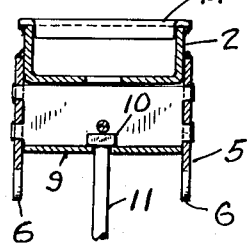
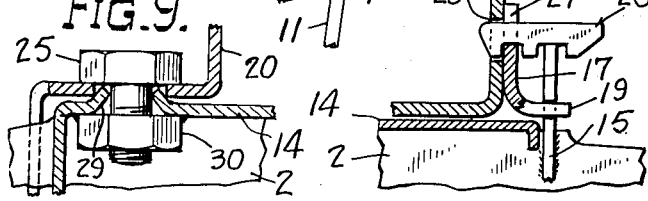
INVENTOR.
Donald W. Sherman
BY
Andrus & Sceales
ATTORNEYS.

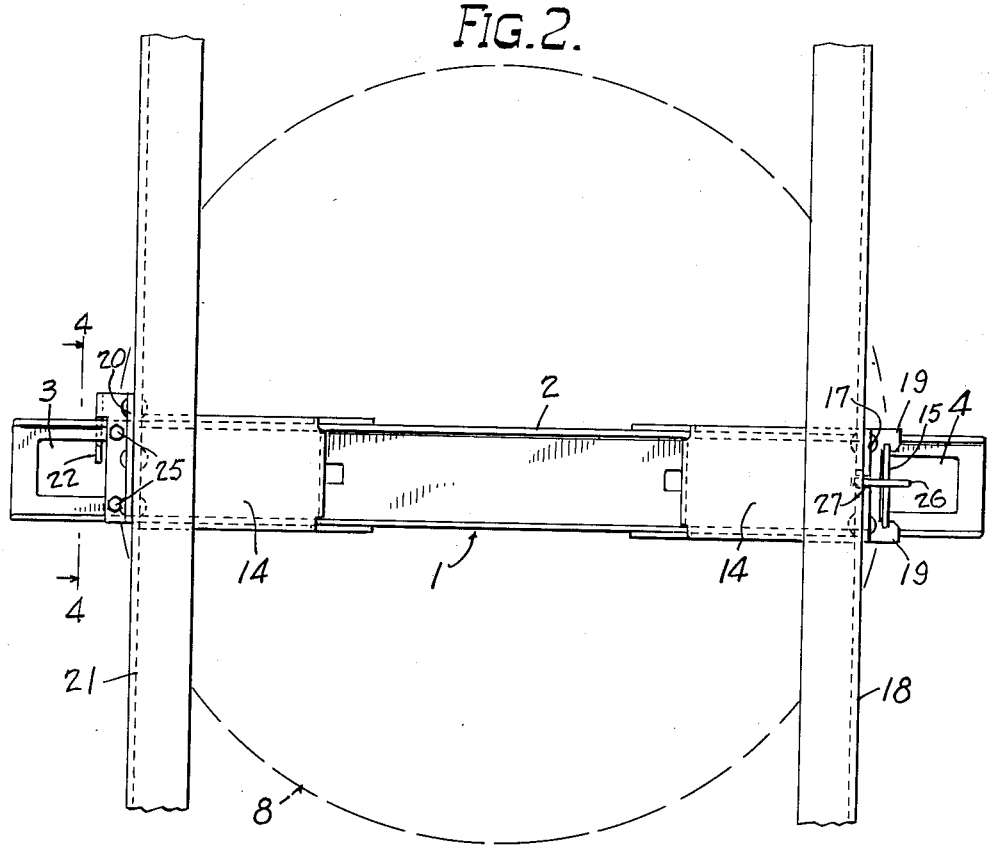
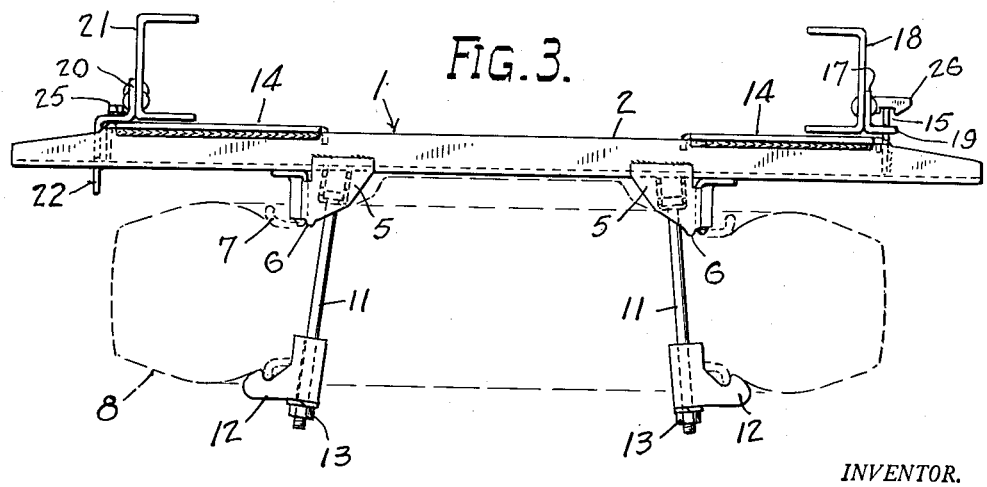

United States Patent Office 2,723,066
Patented Nov. 8, 1955

2,723,066

DEMOUNTABLE CARRIER FOR SPARE AUTOMOBILE WHEELS

Donald W. Sherman, Shorewood, Wis., assignor to Parts Engineering Co., Inc., Watertown, Wis., a corporation of Wisconsin Application July 24, 1952, Serial No. 300,660

11 Claims. (Cl. 224—42.21)

This invention relates to automotive tire carriers and particularly spare wheel carriers for trucks having large tires of considerable weight.

This invention provides a tire carrier comprising a single cross-beam which supports the spare tire and wheel thereunderneath and is adapted to be secured and removed separately at opposite ends from the underside of the truck frame.

An object of the invention is to facilitate the loading and unloading of the tire and wheel and the attachment and detachment of the carrier from the truck.

Another object is to provide for such handling of the tire and wheel by one man.

Another object is to support the rim against the carrier at points adjacent to the rim support bolts so as to reduce the stress in the carrier cross member arising from the bolt tension, thereby providing a lighter weight carrier.

Another object is to attach the wheel to the carrier at locations adjacent to the securement of the carrier to the truck frame and thereby provide for a lighter weight carrier.

Another object is to use straight bolts for carrying the wheel and tire as pure tension members and allow the use of lighter and less expensive bolts.

Another object is to provide a basic tire carrier which will handle all sizes of tires and rims by changing only the spacing of mounting brackets and bolt lengths of the carrier itself, the frame mounting brackets and the mounting of the carrier to the chassis being the same for all sizes.

Another object is to provide handle means for lifting the tire alternately at opposite sides of the truck for securement to the truck frame.

These and other objects and advantages will be more fully set forth in the following description of the invention illustrated in the accompanying drawings.

In the drawings:

Fig. 1 is a rear view of a truck and illustrates the tire carrier in the first position of mounting with one end of the tire carrier suspended and the other end of the carrier in position for mounting upon the truck frame member. The dotted lines show the tire carrier and spare wheel as normally carried by the truck;

Fig. 2 is an enlarged plan view of the tire carrier and the tire and wheel and showing part of the truck frame supporting the carrier;

Fig. 3 is an enlarged rear elevation of the truck frame and showing both ends of the tire carrier as secured thereto;

Fig. 4 is a sectional view taken on lines 4—4 of Fig. 2 at one end of the carrier and showing the hanger for the carrier;

Fig. 5 is an elevational view of the opposite hanger for the carrier;

Fig. 6 is a sectional view taken longitudinally of the carrier to show one type of securement of the upper end of the tie bolt supporting the tire;

Fig. 7 is a section taken at right angles to that of Fig. 6 on line 7—7 thereof;

Fig. 8 is a detail sectional view of the latch; and

Fig. 9 is an enlarged section of an alternate form of bolt securement of the end of the carrier shown in Fig. 6.

The tire carrier 1 shown in the drawings comprises a U-shaped beam 2 having openings 3 and 4 at opposite ends of the center section thereof to provide means for grasping the respective ends of the carrier as will be described. The U-shaped plates comprising the chocks 5 are welded to the underside of beam 2 and are provided with spaced lower abutments 6 to fit oppositely the upper inside of rim 7 of the spare tire 8. The small channel members 9 are fitted within chocks 5 to carry the heads 10 of the bolts 11 which extend downwardly through the spare wheel. The hooks 12 are mounted on the lower ends of bolts 11 and engage upwardly the underside of rim 7 oppositely of the corresponding chocks 5. The nuts 13 on the lower ends of bolts 11 are adapted to be tightened and to secure the rim between the corresponding chocks 5 and hooks 12 and hold the spare wheel firmly beneath the carrier. The distance between chocks 5 should be determined by the diameter of rim 7. Where tires of different rim sizes are to be mounted on the same carrier, one or both chocks may be selectively secured to beam 2 for relative adjustment. Abutments 6 are angular to form opposed wedges which serve to compensate for minor variations of rim diameters and carry the high loads directed laterally by the tire against the chocks.

The plates 14 are welded along the upper opposite edges of beam 2 and extend from chocks 5 to corresponding openings 3 and 4 to form separate box structures therebetween.

The vertical end plate 15 is secured by welding within beam 2 at one side at the end of the corresponding plate 14 adjacent to opening 4 and is provided with exposed notches 16 on each side thereof. The angularly formed hanger bracket 17 riveted to the outside of the frame member 18 of the truck is provided with projecting lugs 19 which are shaped to provide a wide opening to receive plate 15 and are spaced to fit notches 16 of plate 15 upon assembly.

The opposite angular hanger bracket 20 is riveted to the outside of the corresponding opposite frame member 21 of the truck, and includes the hook 22 which extends adjacent to and beneath frame member 21 and is adapted to support one end of beam 2 as shown. The horizontal intermediate portion of bracket 20 is located just beneath the lower dimensions of frame member 21 and is provided with spaced holes 23 to receive the conical upper ends of the corresponding weld nuts 24 carried at the outer end of the plate 14 adjacent to opening 3 and the bolts 25.

The latch 26 fits loosely in the notch 27 of and over the upper edge of bracket 17 and within the adjacent opening 28 in frame member 18. The outer projecting end of latch 26 is free to engage the upper end of plate 15 to secure beam 2 against lengthwise movement when supported by lugs 19 and hook 22 upon removal of bolts 25 as in demounting the carrier.

Bolts 25 inserted in holes 23 fit the nuts 24 and when tightened serve to lift the carrier from hook 22 and to secure the corresponding end of beam 2 tightly against the underside of bracket 20 as shown in Fig. 4.

The conical upper end of nuts 24 are adapted to enter holes 23 and to secure the carrier laterally upon tightening of the bolts. Bolts 25 are relieved of the high side loads encountered in service and which are carried directly by the nuts. Each hole 23 is also necessarily larger than bolts 25 so that exact alignment of the nuts 24 and holes 23 is not required for bolt assembly. Upon tightening of the bolts the conical upper ends of the nuts engaging bracket 20 serve to center the nuts in holes 23. When loosening bolts 25, the prompt release of the carrier from bracket 20 is provided by the conical engagement of nuts 24 and bracket 20. After an initial loosening of the bolts the end of the carrier receives the support of hook 22 so that bolts 25 are thereafter free of load and easily removed.

In demounting the carrier from the truck, the bolts 25 secured in nuts 24 are first removed from holes 23 as described to free the corresponding end of beam 2 so that the same is supported solely by the hook 22. The opposite end of the carrier is then released by lifting the latch 26 carried by bracket 17 to release plate 15 and allow the carrier to be moved lengthwise and plate 15 to be disengaged from lugs 19. The end of beam 2 which is adapted to slide on hook 22 remains supported thereby while the free end of beam 2 is then lowered until the tire 8 rests on the ground. The end of beam 2 remaining suspended by hook 22 is then released therefrom and the carrier is lowered so that the wheel and tire 8 are on the ground and beneath the rear of the truck.

The carrier beam 2 is of a length which provides handle means at opposite ends thereof extending beyond the diameter of the tire and projects beyond the tread of the tire allowing the operator to drag the tire on the ground from beneath the truck by either end of beam 2. The tire is easily handled by means of either end of beam 2 for removal of the carrier from the tire by turning of nuts 13 from bolts 11 and removing hooks 12.

After changing wheels the carrier is similarly re-secured to the wheel of the tire to be carried as a spare unit and is then moved into position under the truck at the rear thereof for mounting. The carrier is mounted beneath the truck by first lifting one end of beam 2 and engaging the same for support by hook 22 while the opposite side of tire 8 remains on the ground beneath the truck. The opposite end of beam 2 is then lifted upwardly into a position directly in alignment with bracket 17 and the carrier is then moved laterally until plate 15 is mounted on the lugs 19 of member 17 and latch 26 has engaged the top edge of plate 15 to secure the carrier against dislocation in the opposite direction.

In the mounting of the carrier as described, the end of beam 2 carried by hook 22 is allowed to slide on the hook which serves to support the end of beam 2 temporarily and allow the operator to move around to the other side of the truck and insert bolts 25 in the holes 23 of bracket 20. By tightening bolts 25, beam 2 is drawn up tightly against the underside of bracket 19 to secure the tire carrier against rattling. Beam 2 is of sufficient width so that the holes 23 for bolts 25 may be widely spaced.

Plates 14 which extend from chocks 5 to the opposite points of securement of beam 2 provide the torsional rigidity required to prevent torsional vibration of the assembly and to resist damage from collision of the spare tire with loading docks.

In the alternate construction shown in Fig. 9 the end of plate 14 adjacent to opening 3 is provided with the upwardly formed, extruded cone 29 having a central opening for receiving a bolt 25 inserted in each corresponding hole 23 of bracket 20. A plain nut 30 is welded to the underside of the plate beneath each cone 29 to receive and secure the lower end of the respective bolt. Each cone 29 fits within the corresponding hole 23 to center and secure the carrier laterally as in the embodiment described above.

The length of beam 2 provides a favorable mechanical advantage to the person lifting the tire and requires a minimum of effort in securing the carrier, including the tire unit to the underside of the truck frame.

The welded construction of stamped metal parts in the form provided by the invention reduces to a minimum the cost of the carrier.

If desired either or both of chocks 5 may be moveable to accommodate tires and rims of different sizes.

Various embodiments of the invention may be employed within the scope of the following claims.

I claim:

1. A tire carrier for removably securing a spare tire unit to the underside of a vehicular frame, comprising a bracket fixed at one side of the automobile frame and having spaced projecting lugs extending outwardly and laterally therefrom, a second bracket oppositely secured at the other side of the frame and having bolt holes to receive bolts extending downwardly therethrough and a lower bracket therebeneath in the form of a hook laterally offset and spaced from said first side of the frame and oppositely of said lugs, a beam adapted to be secured to a spare tire unit and having recesses at one end thereof to receive said lugs, and bolt holes at the opposite end thereof to register with the holes of said second bracket to receive bolts therethrough for securement of a corresponding end of said beam to the underside of said second bracket, said bracket hook being disposed to support said corresponding end of said beam prior to insertion of bolts in said second bracket, said lower bracket hook being offset and of a height whereby said holes are brought into registry upon raising the beam and supporting the corresponding end thereof on said lugs allowing insertion of bolts through the registering holes of said beam and said second bracket.

2. A spare tire carrier for securement to spaced frame members of a vehicle, which comprises a single beam to extend across and above the diameter of the tire, handle means formed at opposite ends of the beam and extending beyond the diameter of the tire, and securement means carried by said beam and adapted to fit the rim of the tire and having means to engage the tire rim oppositely thereof and secure the same therebetween and to the beam.

3. In a tire carrier, a pair of spaced parallel side frames, a single beam suspending the tire between the ends of the beam, bracket means comprising spaced projecting lugs to be secured to one of said frames, corresponding supporting means carried by said beam at one end thereof to engage said lugs, a hook carried by the other frame member at the opposite end of the beam to support the latter temporarily while mounting the opposite end of the beam on said lugs, and bolts adapted to secure said beam to said last-named frame member and lift the beam from said hook after securement of the opposite end of the beam on said lugs.

4. A tire carrier assembly for a spare tire for supporting the same beneath spaced parallel frame members of a vehicle and the like, which comprises a first bracket secured to one of said frame members and having bolt holes opening downwardly and spaced longitudinally of said member, a support hook fixed with respect to said bracket and extending therebeneath and adjacent to the bolt holes thereof, a second bracket secured to the other of said frame members oppositely of the first bracket and having projecting lugs extending horizontally and relatively spaced longitudinally of the frame member, a beam having means for securement of the spare tire to the beam between the ends thereof, a plate secured to said beam adjacent to one end thereof and disposed upright and transversely thereof when the tire is suspended downwardly thereof, said plate having notches to receive said lugs and to support the corresponding end of said beam upon movement thereof with said plate to dispose the latter between the lugs, and spaced threaded means adapted to receive bolts inserted through said bolt holes for securing the opposite end of said beam to the other frame member and lifting the same from said hook, said threaded means and lugs being disposed to secure said beam against rotation by the weight of the tire.

5. A demountable tire carrier for vehicles comprising a beam having means for securing a tire unit centrally of and to the underside of the beam, a bracket carried by the frame of the vehicle and disposed to receive and support one end of the beam temporarily with a portion of the tire supporting the other end of the beam from the ground, a first means carried by the vehicle frame to receive and secure thereto said other end of the beam, and a second means carried by the vehicle frame adjacent to said bracket to secure said one end of the beam to the vehicle frame and in a position relieving said bracket of the weight thereof.

6. The invention as defined in claim 5 wherein the ends of the beams individually include handle means for alternate use in manipulation of the tire unit and said bracket.

7. A demountable spare tire and wheel carrier for vehicles comprising a beam having handle means formed at opposite ends thereof, means to secure said beam to the wheel and to extend across the tire whereby each handle projects beyond the circumference of the tire and above the tire and wheel as when laid upon the ground and to provide for movement of the tire and wheel across the ground by alternate lifting of each end of the beam and turning on the portion of the side of the tire resting on the ground, and means for securing said beam to a vehicle.

8. The invention of claim 7 wherein said last named means comprises separate devices to receive successively the opposite ends of said beam whereby the beam may be mounted and secured to the vehicle by alternate manipulation of opposite ends of the beam separately.

9. A tire carrier for a vehicle having a frame with a pair of spaced side rails, comprising a cross beam, means to fixedly secure a tire to the cross beam with the tire suspended therebeneath, and means to removably secure said beam at its ends beneath and to the corresponding side rails of the vehicle frame, said last named means having bracket means functioning temporarily to facilitate first suspension of one end of the beam from one side rail followed by suspension of the other end of the beam from the other side rail and final fixed securement means for the beam to both side rails, and the ends of the beam being disposed substantially above the center of mass of the assembled tire and beam to facilitate the sequential assembly outlined above, whereby one man can readily assemble and disassemble the carrier.

10. The construction of claim 9 in which the ends of the beam extend beyond said frame securing means to provide end handles substantially above the center of gravity for ready manipulation thereof.

11. The construction of claim 9 in which the ends of the beam extend beyond said frame securing means to provide end handles substantially above the center of gravity for ready manipulation thereof, and the tire suspension and length of the beam are correlated so that the end of the beam does not engage the ground during the first assembly step wherein one end of the beam is raised and temporarily suspended from the corresponding side rail.

References Cited in the file of this patent
UNITED STATES PATENTS

| | | |
|---|---|---|
| 1,761,968 | Bock | June 3, 1930 |
| 1,803,938 | Jantsch | May 5, 1931 |
| 2,354,944 | Clark | Aug. 1, 1944 |
| 2,563,810 | Ballard | Aug. 14, 1951 |